(12) United States Patent
Yu et al.

(10) Patent No.: US 8,536,804 B2
(45) Date of Patent: Sep. 17, 2013

(54) CONVERTING CONTROLLER

(75) Inventors: Chung-Che Yu, New Taipei (TW);
Shian-Sung Shiu, New Taipei (TW);
Li-Min Lee, New Taipei (TW);
Juan-Juan Liu, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 177 days.

(21) Appl. No.: 13/304,271

(22) Filed: Nov. 23, 2011

(65) Prior Publication Data
US 2012/0229050 A1 Sep. 13, 2012

(30) Foreign Application Priority Data

Mar. 8, 2011 (TW) .............................. 100107636 A

(51) Int. Cl.
*H05B 37/02* (2006.01)
*G05F 1/46* (2006.01)

(52) U.S. Cl.
USPC .......................................... 315/307; 315/193

(58) Field of Classification Search
USPC ............. 315/307, 291, 185 R, 193, 297, 302; 323/265; 327/77, 205
See application file for complete search history.

(56) References Cited

U.S. PATENT DOCUMENTS

| 7,961,158 B2 * | 6/2011 | Chou et al. ...................... 345/82 |
| 2008/0290906 A1 * | 11/2008 | Chou et al. ...................... 327/77 |
| 2011/0089918 A1 * | 4/2011 | Chang ........................... 323/282 |
| 2012/0235570 A1 * | 9/2012 | Yu ................................. 315/121 |

* cited by examiner

*Primary Examiner* — Daniel D Chang
(74) *Attorney, Agent, or Firm* — CKC & Partners Co., Ltd.

(57) ABSTRACT

A converting controller is provided and comprises a first comparing unit, a second comparing unit, a duty cycle operating unit and a reference voltage supplying unit. The first comparing unit receives a detecting signal representing a state of the load and a first reference signal, and generates a first comparing signal accordingly. The duty cycle operating unit controls power conversion of the converting circuit according to the first comparing signal. The second comparing unit receives the detecting signal and a second reference signal, and generates a second comparing signal accordingly. The reference voltage supplying unit supplies the first reference signal and adjusts a level of the first reference signal in response to the second comparing signal.

15 Claims, 3 Drawing Sheets

CONVERTING CONTROLLER

RELATED APPLICATIONS

This application claims priority to Taiwan Application Serial Number 100107636, filed Mar. 8, 2011, which is herein incorporated by reference.

BACKGROUND OF THE INVENTION (1) Field of the Invention

This invention relates to a converting controller, and more particularly to a converting controller with an active error correction for feedback control.

(2) Description of the Prior Related Art

FIG. 1 is a schematic circuit diagram of a conventional LED driving circuit. The LED driving circuit includes an inductor L, a switch M1, a diode M2, a current detecting resistor Ri, and a converting controller 10. One end of the inductor L is coupled to an input power source Vin, and the other end thereof is coupled to the positive end of the LED module 20. The negative end of the LED module 20 is coupled to one end of the switch M1, and the positive end of the diode M2. Another end of the switch M1 disposed away from the LED module 20 is grounded through the current detecting resistor Ri. The negative end of the diode M2 is coupled to the input power source Vin and the inductor L for freewheeling current.

The converting controller 10 is an integrated circuit, and is usually packaged into a single chip with the pins including a feedback end FB, a power end VD, a driving end DR, a grounding end GD, etc. The power end VD is coupled to a driving power source VDD for accessing operating power. The grounding end GD is grounded. When the switch M1 is conducted, an LED current of the LED module 20 flows through the switch M1 and the current detecting resistor Ri to ground, and a current detecting signal Ifb is generated. The converting controller 10 receives the current detecting signal Ifb via the feedback end FB for determining whether the LED current reaches a predetermined peak value or not. If yes, the switch M1 will be temporarily switched off for a predetermined off time to have the LED current staying between the predetermined peak value and a valley value.

Ideally, the peak value of the LED current should be a fixed value without being changed by the voltage of the input power source Vin or other factors. However, the circuit has a response time delay which will affect a current change slope for various input power sources Vin, and thus the actual current peak varies with the input power source Vin. In addition, the component error in inductance value of the inductor L is quite significant and may change the amount of time delay even under the same application environment. The aforementioned issues will become uncontrollable variables in actual applications.

Thus, it is an important issue desired to be resolved in the field to reduce or even control the influence of error and response time delay between the ideal case and the actual case within an acceptable range.

SUMMARY OF THE INVENTION

In view of the difficulty of feedback control in prior art, which resulted from the uncontrollable component error and response time delay between the ideal case and the actual case, the present invention uses two detecting circuits of which one is for feedback control and the other one is for determining whether the control result excesses a predetermined range or not and adjusting the detecting circuit for feedback control, thereby restricting the error of feedback control within an acceptable range.

For achieving the aforementioned object, the present invention provides a converting controller for controlling a converting circuit to convert an input power into an output power for driving a load. The converting controller comprises a first comparing unit, a second comparing unit, a duty cycle operating unit and a reference voltage supplying unit. The first comparing unit is used to receive a detecting signal representing a state of the load and a first reference signal, and generate a first comparing signal accordingly. The duty cycle operating unit is used to control the converting circuit to perform power conversion according to the first comparing signal. The second comparing unit is used to receive the detecting signal and a second reference signal and generate a second comparing signal accordingly. The reference voltage supplying unit is used to supply the first reference signal and adjust a level of the first reference signal in response to the second comparing signal.

The present invention also provides another converting controller for controlling a converting circuit to convert an input power into an output power to drive a load. The converting controller includes a first hysteresis comparing unit, a second hysteresis comparing unit, a duty cycle operating unit, and a reference voltage supplying unit. The first hysteresis comparing unit generates a first hysteresis comparing signal according to a detecting signal representing a state of the load, a first upper reference signal, and a first lower reference signal. The duty cycle operating unit controls power conversion of the converting circuit according to the first hysteresis comparing signal. The second hysteresis comparing unit generates a second hysteresis comparing signal according to the detecting signal, a second upper reference signal, and a second lower reference signal. The reference voltage supplying unit supplies the first upper reference signal and the first lower reference signal, and adjusts levels of the first upper reference signal and the first lower reference signal in response to the second hysteresis comparing signal, wherein a level of the second upper reference signal is higher than the level of the first upper reference signal, and a level of the second lower reference signal is lower than the level of the first lower reference signal.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
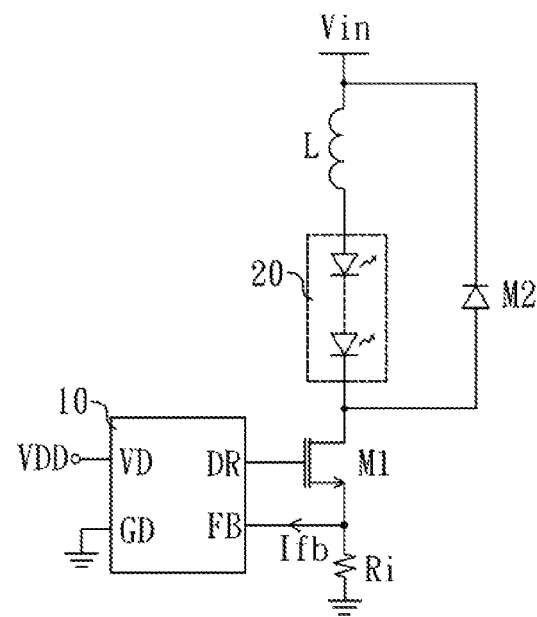
FIG. 1 is a schematic circuit diagram of a conventional LED driving circuit.
Figure 2:
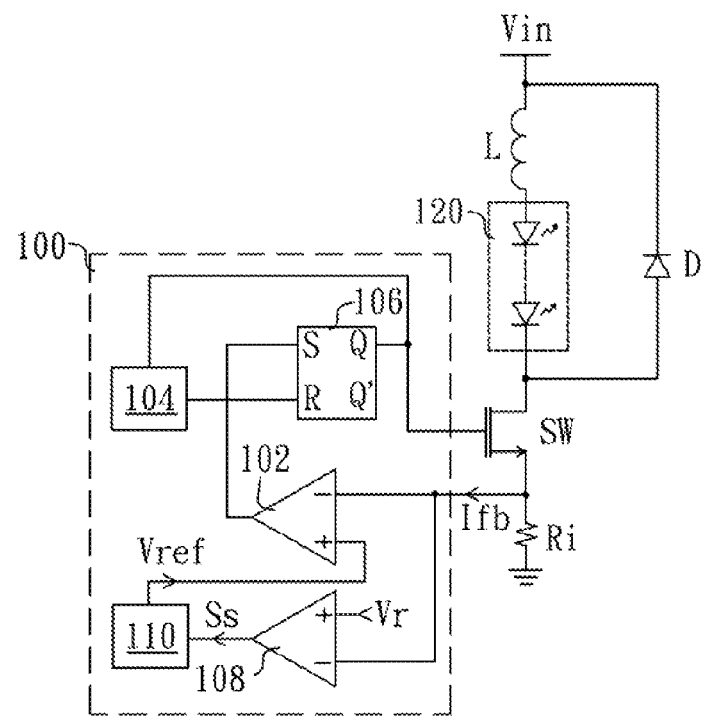
FIG. 2 is a schematic circuit diagram showing a converting controller in accordance with a first preferred embodiment of the present invention for driving a LED module.

FIG. 2 is a schematic circuit diagram showing a converting controller in accordance with a first preferred embodiment of the present invention for driving a LED module. As shown in FIG. 2, the LED driving circuit includes a converting circuit (not labeled) and a converting controller 100. The converting circuit includes an inductor L, a switch SW, a diode D, and a current detecting resistor Ri. The converting controller 100 controls the on/off state of the switch SW. The input power from the input power source Vin is converted into an output power by the converting circuit for driving a load. In the present embodiment, the load is an LED module 120. When the switch SW is turned on, the current provided by the input power source Vin flows through the inductor L, the LED module 120, the switch SW, and the current detecting resistor Ri to ground. When the switch SW is turned off, the current is provided by the inductor L and flows through the LED module 120 and the diode D to the input power source Vin. The converting controller 100 may be an integrated circuit packaged in a single chip. The converting controller 100 receives a current detecting signal Ifb generated by the current detecting resistor Ri so as to determine whether the LED current flowing through the LED module 120 reaches a predetermined valley value or not. If yes, the switch SW is temporarily turned on for a predetermined on time before being turned off again. Thus, the LED current flowing through the LED module 120 is controlled within a predetermined range.

In the present embodiment, the converting controller 100 is a controller with constant on-time control, which includes a first comparing unit 102, a second comparing unit 108, a duty cycle operating unit (not labeled), and a reference voltage supplying unit 110. The duty cycle operating unit includes a constant on-time unit 104 and a SR flip-flop 106. The first comparing unit 102 receives the current detecting signal Ifb at the inverting input thereof and a first reference signal Vref generated by the reference voltage supplying unit 110 at the non-inverting input thereof, and generates a first comparing signal accordingly. The set input S of the SR flip-flop 106 is coupled to the output of the first comparing unit 102 for receiving the first comparing signal. When the LED current flowing though the LED module 120 is smaller than a predetermined valley value, the comparing unit 102 outputs the high-level first comparing signal to trigger the SR flip-flop 106 so as to have the SR flip-flop 106 generate a high-level signal at the output Q thereof, thereby turning on the switch SW. Thus, the LED current begins to increase. Meanwhile, the high-level signal at the output Q is also transmitted to the constant on-time unit 104 to have the constant on-time unit 104 begin counting time. After the switch SW being turned on for a constant on time, the constant on-time unit 104 generates a high-level signal to the reset input R of the SR flip-flop 106 so as to have the output signal at the output Q shifted to low-level, thereby turning off the switch SW. At this time, the LED current on the LED module 120 beings to decrease. The LED current keeps decreasing until reaching the predetermined valley value to trigger the SR flip-flop 106, such that the SR flip-flop generates the high-level output signal at the output Q again and the next cycle begins.

The second comparing unit 108 receives the current detecting signal Ifb at the inverting input thereof and a second reference signal Vr at the non-inverting input thereof. The level of the second reference signal Vr is lower than that of the first reference signal Vref. As the level of the current detecting signal Ifb is lower than the first reference signal Vref, the first comparing unit 102 generates the high-level signal to trigger the SR flip-flop 106 to turn on the switch SW. Because of circuit delay, before the switch SW is turned on to increase the LED current on the LED module 120, the level of the current detecting signal Ifb has declined to the level below the first reference signal Vref. If the level of the current detecting signal Ifb is lower than the second reference signal Vr, the second comparing signal Ss outputted by the second comparing unit 108 will be shifted to be high-level and transmitted to the reference voltage supplying unit 110. The reference voltage supplying unit 110 has the first reference signal Vref which is set at a default level as the circuit is started. The reference voltage supplying unit 110 may increase the level of the first reference signal Vref when receiving the high-level second comparing signal Ss from the second comparing unit 108. Thus, the valley value of LED current in the next cycle will be increased. If the valley value of the actual current detecting signal Ifb is still lower than the second reference signal Vr, the reference voltage supplying unit 110 may enhance the level of the first reference voltage Vref again until the valley value of the actual current detecting signal Ifb is higher than the level of the second reference signal Vr.

In conclusion, the present invention adapts two comparing units for determining whether the error between the valley value of actual LED current and the predetermined valley value stays within an acceptable range (i.e., the voltage difference between the second reference signal Vr and the default level of the first reference signal Vref). If not, the level of the first reference signal Vref will be increased to compensate the error due to circuit delay so as to make sure that the error stays in the acceptable range.

Certainly, the converting controller of the present invention may be a controller with constant off-time control, which detects whether the LED current flowing through the LED module 120 reaches a predetermined peak value. If yes, the switch will be turned off for a predetermined constant off time. The second comparing circuit, which is not for feedback control, is utilized for determining whether the peak value of the actual LED current is located within the acceptable range. Thus, the reference level for the aforementioned determination (which is corresponding to the second reference signal in the aforementioned embodiment) should be higher than the level of the reference signal (which is corresponding to the first reference signal in the aforementioned embodiment) for feedback control. Under normal operation, the variation of the current detecting signal indicative of the LED current merely reaches the level of the first reference signal. As the error is beyond the acceptable range, the variation of the current detecting signal may reach the level of the second reference signal. Of course, the variation of the current detecting signal first reaches the level of the first reference signal and then reaches the level of the second reference signal.

Figure 3:
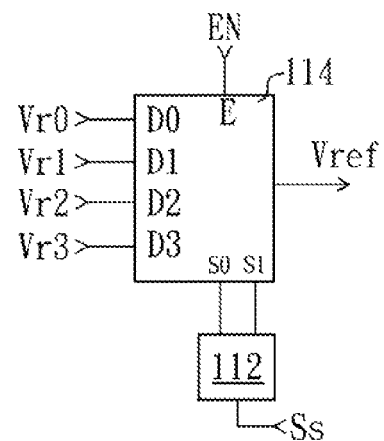
FIG. 3 is a schematic circuit diagram of a reference voltage supplying unit in accordance with a preferred embodiment of the present invention.

FIG. 3 is a schematic circuit diagram of a reference voltage supplying unit in accordance with a preferred embodiment of the present invention. As shown in FIG. 3, the reference voltage supplying unit includes a counter 112 and a multiplexer 114. The counter 112 counts the times of high-level signals generated by the second comparing unit 108 and outputs a signal to the select ends S0 and S1 of the multiplexer 114 to select a corresponded output signal. The multiplexer 114 receives different reference signals Vr0, Vr1, Vr2 and Vr3 from the inputs D0, D1, D2 and D3 respectively, and selects one of the reference signals as the first reference signal Vref. In addition, the multiplexer 114 also receives an enable signal at the enable input E such that when each time the system is restarted, the multiplexer 114 may select a predetermined initial signal to have the first reference signal Vref backs to its default level. The reference signals Vr0, Vr1, Vr2 and Vr3 are preferably set to identical intervals, i.e., the reference voltage supplying unit 110 adjusts the level of the first reference signal Vref by means of step-like modulation.

Figure 4:
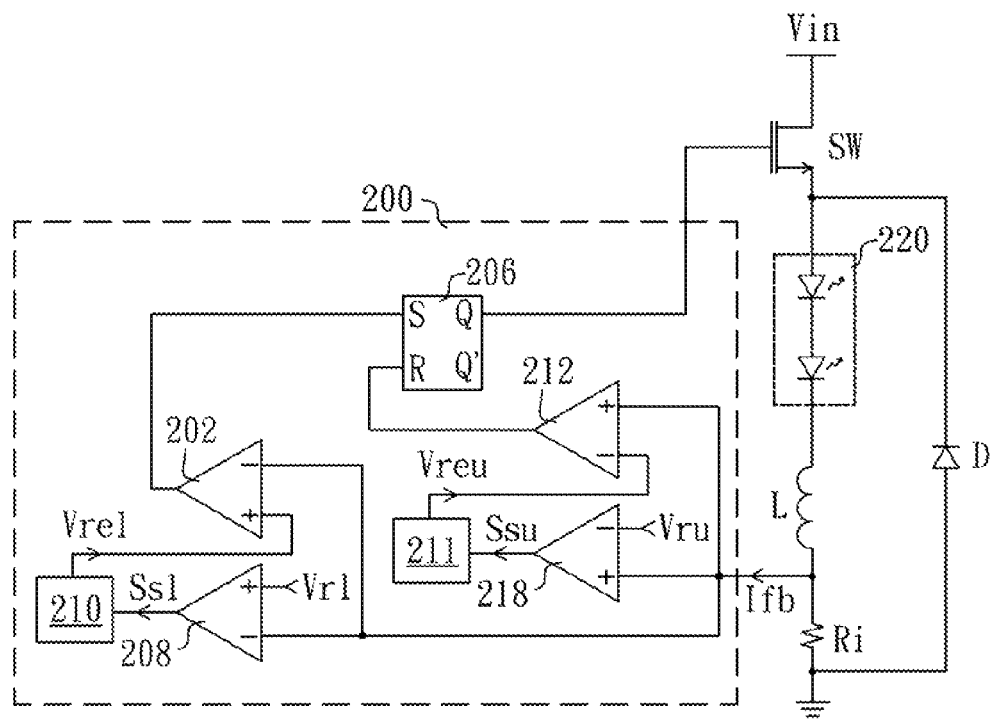
FIG. 4 is a schematic circuit diagram showing a converting controller in accordance with a second preferred embodiment of the present invention for driving a LED module and FIG. 5 is a schematic circuit diagram showing the converting controller in accordance with a third preferred embodiment applied in a DC-to-DC buck converting circuit.

FIG. 4 is a schematic circuit diagram showing a converting controller in accordance with a second preferred embodiment of the present invention for driving an LED module. The LED driving circuit includes a converting circuit (not labeled) and a converting controller 200. The converting circuit includes an inductor L, a switch SW, a diode D, and a current detecting resistor Ri. The converting controller 200 controls the on/off state of the switch SW. The input power from the input power source Vin is converted into an output power by the converting circuit for driving a load. In the present embodiment, the load is a LED module 220. When the switch SW is turned on, the current provided by the input power source Vin flows through the switch SW, the LED module 220, the inductor L, and the current detecting resistor Ri to ground. When the switch SW is turned off, the current is provided by the inductor L and flows through the current detecting resistor Ri, the diode D, the LED module 220, and back to the inductor L. Under the circuit architecture of the present embodiment, no matter when the switch SW is turned on or off, the LED current on the LED module 220 must flow through the current detecting resistor Ri. The converting controller 220 receives the current detecting signal Ifb generated by the current detecting resistor Ri for determining whether the LED current on the LED module 220 reaches a predetermined peak value or a predetermined valley value. If yes, the switch SW would be turned off or on correspondingly to have the value of the LED current on the LED module stay between the predetermined valley value and the predetermined peak value.

In the present embodiment, the converting controller 200 includes a first hysteresis comparing unit (not labeled), a second hysteresis comparing unit (not labeled), a duty cycle operating unit (not labeled), and a reference voltage supplying unit (not labeled). The first hysteresis comparing unit includes a first upper comparing unit 212 and a first lower comparing unit 202. The second hysteresis comparing unit includes a second upper comparing unit 218 and a second lower comparing unit 208. The duty cycle operating unit includes a SR flip-flop 206. The reference voltage supplying unit includes an upper reference voltage supplying unit 211 and a lower reference voltage supplying unit 210. The first lower comparing unit 202 receives the current detecting signal Ifb at the inverting input thereof and a first lower reference signal Vrel from the lower reference voltage supplying unit 210 at the non-inverting input thereof so as to generate a first lower comparing signal. The first upper comparing unit 212 receives the current detecting signal Ifb at the non-inverting input thereof and a first upper reference signal Vreu from the upper reference voltage supplying unit 211 at the inverting input thereof, so as to generate a first upper comparing signal. The level of the first lower reference signal Vrel is lower than that of the first upper reference signal Vreu. The set input S of the SR flip-flop 206 is coupled to the first lower comparing unit 202 for receiving the first lower comparing signal, and the reset input R thereof is coupled to the first upper comparing unit 212 for receiving the first upper comparing signal. When the level of the current detecting signal Ifb is lower than the first lower reference signal Vrel, the first lower comparing unit 202 outputs high-level first lower comparing signal to have the SR flip-flop 206 output a high-level signal at the output Q to turn on the switch SW. At this time, the LED current on the LED module 220 begins to increase. When the level of the current detecting signal Ifb is higher than the level of the first upper reference signal Vreu, the first upper comparing unit 212 outputs high-level first upper comparing signal to have the SR flip-flop 206 output a low-level signal at the output Q to turn off the switch SW. At this time, the LED current on the LED module 220 begins to decline. Accordingly, the LED current on the LED module 220 can be restricted between the predetermined valley value and the predetermined peak value.

The second lower comparing unit 208 receives the current detecting signal Ifb at the inverting input thereof and a second lower reference signal Vrl at the non-inverting input thereof so as to generate a second lower comparing signal Ssl. The level of the second lower reference signal Vrl is lower than that of the first lower reference signal Vrel. The second upper comparing unit 218 receives the current detecting signal Ifb at the non-inverting input thereof and a second upper reference signal Vru at the inverting input thereof so as to generate a second upper comparing signal Ssu. The level of the second upper reference signal Vru is higher than that of the first upper reference signal Vreu. During a time period in which the current detecting single Ifb is lower than the first lower reference signal Vrel to have the SR flip-flop turn on the switch SW, the LED current on the LED module 220 keeps decreasing. If the current detecting signal Ifb is finally lower than the second lower reference signal Vrl, the second lower comparing unit 208 generates a high-level second lower comparing signal Ssl to have the lower reference voltage supplying unit 210 increase the level of the first reference signal Vrel. Thus, the voltage difference between the first lower reference signal Vrel and the second lower reference signal Vrl will be increased until the actual valley value of the current detecting signal Ifb is no longer lower than the level of the second lower reference signal Vrl. during a time period at which the level of the current detecting signal Ifb is higher than the first upper reference signal Vreu to have the SR flip-flop turn off the switch SW, the LED current on the LED module 220 keeps increasing. If the level of the current detecting signal Ifb is finally higher than the second upper reference signal Vru, the second upper comparing unit 218 generates a high-level second upper comparing signal SSu to have the upper reference voltage supplying unit 211 reduce the level of the first upper reference signal Vreu. Thus, the voltage difference between the first upper reference signal Vreu and the second upper reference signal Vru will be increased until the actual peak value of the current detecting signal Ifb is no longer higher than the level of the second upper reference signal Vru.

Figure 5:
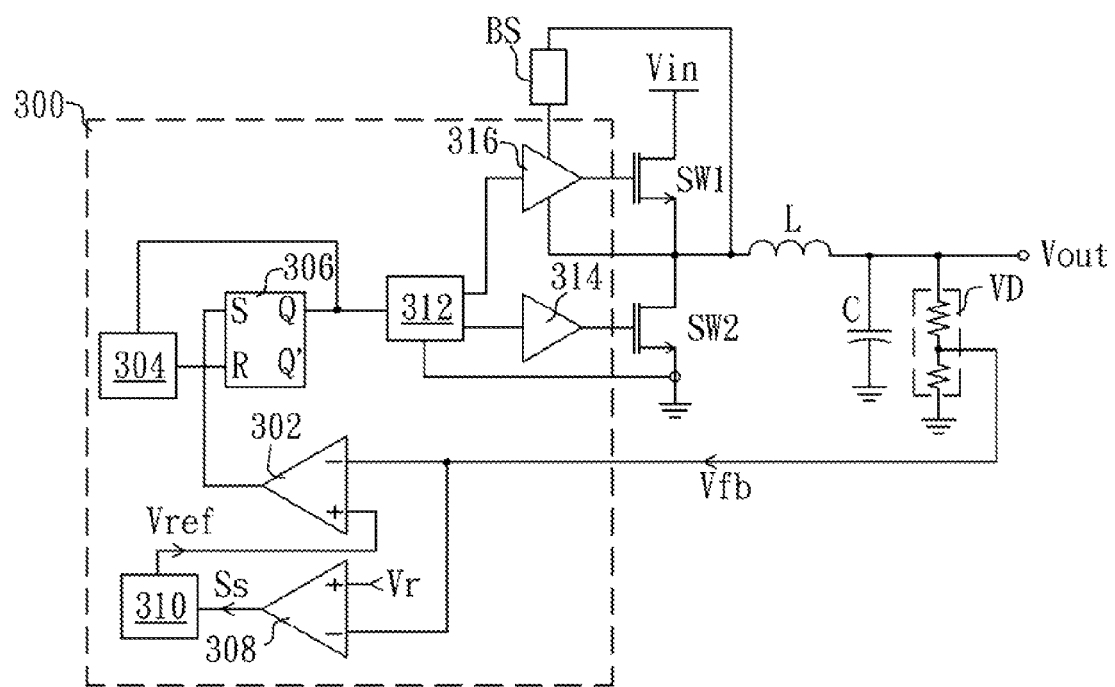

The converting controller of the present invention may be applied to not only the current-mode feedback control as mentioned above but also the voltage-mode feedback control. FIG. 5 is a schematic circuit diagram showing the converting controller in accordance with a third preferred embodiment applied in a DC-to-DC buck converting circuit. The DC-to-DC buck converting circuit includes a buck converting circuit (not labeled) and a converting controller 300. The buck converting circuit includes an inductor L, switches SW1 and SW2, a capacitor C, and a voltage detecting circuit VD. The voltage detecting circuit VD generates a voltage detecting signal Vfb according to an output voltage supplied from the buck converting circuit. The converting controller 300 controls the on/off state of the switches SW1 and SW2 to have the input power from the input power source Vin converted into the output power with the output voltage Vout according to voltage detecting signal Vfb.

The converting controller 300 includes a first comparing unit 302, a second comparing unit 308, a duty cycle operating unit, and a reference voltage supplying unit 310. The duty cycle operating unit includes a constant on-time unit 304, a SR flip-flop 306, a logic unit 312, an upper driving unit 316 and a lower driving unit 314. The first comparing unit 302 receives the voltage detecting signal Vfb at the inverting input thereof and a first reference signal Vref generated by the reference voltage supplying unit 310 at the non-inverting input thereof so as to generate a first comparing signal. The set input S of the SR flip-flop 306 is coupled to the first comparing unit 302 for receiving the first comparing signal. When the output voltage Vout is lower than a predetermined valley value, the first comparing signal is at high-level, and thus the SR flip-flop 306 outputs a high-level signal at the output Q. At this time, the logic unit 312 turns on the switch SW1 through the upper driving unit 316 to have the power from the input power source Vin supplied to the buck converting circuit. In addition, to make sure that the switch SW1 can be turned on by the upper driving unit 316, a bootstrap circuit BS may be added to the buck converting circuit for providing a sufficiently high voltage level to the upper driving unit 316. The high-level signal from the output Q of the SR flip-flop 306 is also transmitted to the constant on-time unit 304 to have the constant on-time unit 304 begin counting. After the switch SW1 is turned on for a constant on time, the constant on-time unit 304 generates a high-level signal to the reset input R of the SR flip-flop 306 to have the level at the output Q of the SR flip-flop shifted to low-level. Meanwhile, the logic unit 312 turns off the switch SW1 through the upper driving unit 316 and turns on the switch SW2 through the lower driving unit 314 to freewheel the inductor current. The logic unit 312 also determines whether the freewheeling current is reduced to zero or not. If yes, the logic unit 312 turns off the switch SW2 to avoid reverse current from the inductor L.

The second comparing unit 308 receives the voltage detecting signal Vfb at the inverting input thereof and a second reference signal Vr at the non-inverting input thereof. The level of the second reference signal Vr is lower than that of the first reference signal Vref. When the first comparing unit 302 detects that the level of the voltage detecting signal Vfb is just lower than that of the first reference signal Vref, the high-level signal is generated to trigger the SR flip-flop 306 to turn on the switch SW1. Because of circuit delay, the actual valley value of the voltage detecting signal Vfb would be lower than the level of the first reference signal Vref. If the actual valley value of the voltage detecting signal Vfb is lower than the second reference signal Vr, the second comparing signal Ss outputted by the second comparing unit 308 may be shifted to high and transmitted to the reference voltage supplying unit 310. The reference voltage supplying unit 310 sets the level of the first reference signal Vref at a default value as the circuit is started, and may increase the level of the first reference signal Vref to increase the voltage difference between the first reference signal Vref and the second reference signal Vr as the second comparing unit 308 outputs the high-level second comparing signal Ss. Thus, the actual valley value of the output voltage Vout will be increased in the next cycle. If the actual valley value is still lower than the level of the second reference signal Vr, the reference voltage supplying unit 310 may increase the level of the first reference signal Vref again, until the valley value of the actual voltage detecting signal Vfb is higher than the level of the second reference signal Vr.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A converting controller for controlling a converting circuit to convert an input power into an output power for driving a load, the converting controller comprising:
   a first comparing unit for receiving a detecting signal representing a state of the load and a first reference signal, and generating a first comparing signal accordingly;
   a duty cycle operating unit for controlling the converting circuit to perform power conversion according to the first comparing signal;
   a second comparing unit for receiving the detecting signal and a second reference signal, and generating a second comparing signal accordingly; and
   a reference voltage supplying unit for supplying the first reference signal and adjusting a level of the first reference signal in response to the second comparing signal.

2. The converting controller of claim 1, wherein a level difference between the first reference signal and the second reference signal is increased after the reference voltage supplying unit receives the second comparing signal.

3. The converting controller of claim 2, wherein the reference voltage supplying unit includes a multiplexer, and the multiplexer receives a plurality of level signals, and supplies one of the level signals as the first reference signal according to a number of the second comparing signal.

4. The converting controller of claim 2, wherein the reference voltage supplying unit adjusts the level of the first reference signal by means of step-like modulation.

5. The converting controller of claim 3, wherein the reference voltage supplying unit adjusts the level of the first reference signal by magnifying a level difference between the first reference signal and the second reference signal.

6. The converting controller of claim 4, wherein the reference voltage supplying unit adjusts the level of the first reference signal by magnifying a level difference between the first reference signal and the second reference signal.

7. The converting controller of claim 3, wherein the load is an LED (Light-Emitting Diode) module, and the detecting signal represents an amount of a current flowing through the LED module.

8. The converting controller of claim 4, wherein the load is an LED module, and the detecting signal represents an amount of a current flowing through the LED module.

9. The converting controller of claim 7, wherein the converting controller is a controller with a constant on-time control or a constant off-time control.

10. The converting controller of claim 8, wherein the converting controller is a fixed on-time controller or a fixed off-time fixed controller.

11. A converting controller for controlling a converting circuit to convert an input power into an output power to drive a load, the converting controller comprising:
    a first hysteresis comparing unit for generating a first hysteresis comparing signal according to a detecting signal representing a state of the load, a first upper reference signal, and a first lower reference signal;
    a duty cycle operating unit for controlling power conversion of the converting circuit according to the first hysteresis comparing signal;
    a second hysteresis comparing unit for generating a second hysteresis comparing signal according to the detecting signal, a second upper reference signal, and a second lower reference signal; and
    a reference voltage supplying unit for supplying the first upper reference signal and the first lower reference signal, and adjusting levels of the first upper reference signal and the first lower reference signal responsive to the second hysteresis comparing signal;

wherein a level of the second upper reference signal is higher than the level of the first upper reference signal, and a level of the second lower reference signal is lower than the level of the first lower reference signal.

12. The converting controller of clam 11, wherein the reference voltage supplying unit has a multiplexer, and the multiplexer receives a plurality of level signals, and supplies two of the level signals as the first upper reference signal and the first lower reference signal according to an amount of the second hysteresis comparing signal.

13. The converting controller of claim 11, wherein the reference voltage supplying unit adjusts the levels of the first upper reference signal and the first lower reference signal by means of step-like modulation.

14. The converting controller of claim 12, wherein the load is an LED module, and the detecting signal represents an amount of a current flowing through the LED module.

15. The converting controller of claim 13, wherein the load is an LED module, and the detecting signal represents an amount of a current flowing through the LED module.

* * * * *